United States Patent Office 2,858,195
Patented Oct. 28, 1958

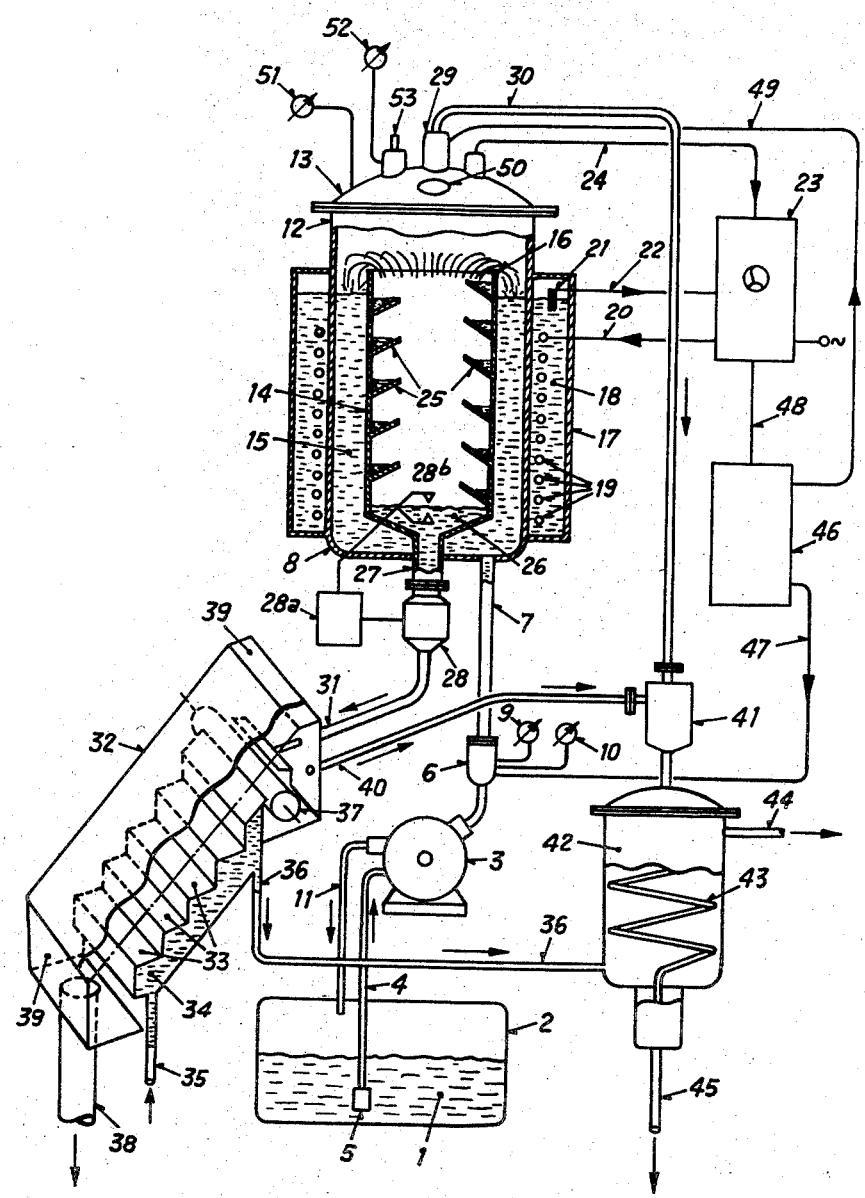

2,858,195
APPARATUS FOR THE CONTINUOUS FABRICATION OF A LABILE RESIN

Otto Vieli, Rhazuns, Graubunden, Switzerland, assignor to Spumalit-Anstalt, Vaduz, Liechtenstein, a company of the Principality of Liechtenstein Application April 9, 1954, Serial No. 422,176

Claims priority, application Switzerland April 15, 1953

4 Claims. (Cl. 23—260)

The present invention relates to a process and plant for the continuous fabrication of a labile plastic with an aminoplast base.

The process is characterized by the fact that the liquid initial substance is conveyed in adjustable quantities and under excess pressure through a contact furnace. In this furnace the initial substance, after being continuously heated from normal temperature to a predetermined maximum temperature, enters a large-surface evaporator through which it passes along a predetermined path, flowing from zones of maximum temperature to those of lesser temperature, at the end of which path the plastic produced leaves the contact furnace in adjustable quantities and is then conveyed over a surface cooler and cooled down to normal temperature under atmospheric pressure. The heating period and the time the substance remains in the large-surface evaporator of the contact furnace is, in view of the swiftly progressive polycondensation, only a few minutes altogether, according to the quantity produced, and the process is brought to a stop by the surface cooler at a moment when the liquid plastic produced is, although stable, extremely sensitive to small amounts of certain catalysts under the influence of which the interrupted polycondensation proceeds at normal temperature and atmospheric pressure until the plastic is completely hardened.

The plant for carrying out the process is characterized by the fact that the liquid initial substance is conveyed from below by pressure means via a feed regulator to a cylindrical, vertical contact furnace and enters the circular space which is located between the outer wall of the contact furnace and an inner evaporator cylinder. This cylinder extends coaxially in the contact furnace from the latter's base plate to near the top cover where it forms a horizontal rim. The liquid initial substance mounting upwards outside the evaporator cylinder flows over this rim and runs down the inside of the said cylinder. In doing this, however, it passes into an open spiral channel running down the inside of the cylinder, and flows down this channel under the constant influence of the pressure prevailing in the contact furnace and at a predetermined temperature. This temperature is transmitted to the initial liquid mounting up round the evaporator cylinder and hence to the cylinder itself by an adjustable heating unit in the outer wall of the contact furnace. Owing to these influences the initial substance is polycondensed, flows via regulating means out of the contact furnace at the bottom end of the evaporator cylinder's interior and passes through a surface cooler which interrupts the process.

Processes and plants for the fabrication of synthetic resins from urea and formaldehyde have been known for a long time, although the theory of this type of resin formation has not yet been fully clarified. It is, however, accepted today that the question is one of polycondensation and not, as with many other plastics, of polymerization reaction. In the case of the carbamide resins discussed in the present invention and which belong to the group of the so-called aminoplasts, the formation of resin is effected according to present-day knowledge in three phases as follows:

Phase A=formation of crystalline methylol compounds;

Phase B=condensation to soluble or dispersible, linear, branched or cyclic molecules;

Phase C=formation of two to three dimensional molecular networks into hard, insoluble and infusible products.

In the known processes for producing resin from urea and formaldehyde a urea-formaldehyde solution serving as initial substance is treated with a reflux solution for several hours at a temperature of 90° C., which gives a yield of some 60 to 70 percent. The end product, however, called carbamide resin, has as a rule an unpleasant smell of formaldehyde. In addition, the complicated fabrication process, which it has not so far been possible to make continuous, and the relatively small yield increase the expense of the end product and are thus an obstacle to its application.

These drawbacks of the production methods used hitherto and of their end product are eliminated in the fabrication process and plant envisaged in the present invention. Continuous production according to this process yields a labile, but stable, carbamide resin which hardens by itself when treated with catalysts or heat, can be adapted to the most varied applications, enables the length of the process to be substantially reduced, increases the yield up to 90 percent, and is therefore inexpensive.

The process and the plant for the production of this labile plastic with a base of carbamide resin envisaged in the present invention is described in the following in conjunction with the figure which illustrates a simplified plan of the plant.

In the process according to the invention a liquid initial substance is used in which the dominating components are urea and formaldehyde. Additions of thio urea, as well as possibly melamine, are also present. This mixture is fed to a contact furnace under excess pressure, preferably in the order of magnitude of 4 gauge atmospheres, and it runs through this furnace at a predetermined temperature in a relatively short time which is approximately only a few minutes. In this contact furnace polycondensation is effected extremely quickly, but the process, carried out in the three phases A, B and C, is interrupted at a suitable point and the end product is stabilized so that it can by appropriate means be again polycondensed and fully hardened subsequently as required, that is to say it can be transferred to phase C.

To enable the polycondensation reaction to proceed within the given short space of time, the liquid initial substance is fed in accurately determined quantities by suitable pressure means to the contact furnace where it is continuously heated from normal temperature to a maximum temperature of some 140° to 150° C. It remains throughout this heating under the aforementioned pressure of preferably about 4 gauge atmospheres. Both the pressure and the maximum temperature are kept permanently constant, within the relatively narrow limits of some 5 percent at the values set by automatically operating regulating means. After being heated to the prearranged maximum temperature, which requires the continually fed initial substance to remain a predetermined time in this section of the contact furnace, the said substance enters a large-surface evaporator which forms a further section of the contact furnace and through which the substance runs along a predetermined path. In doing this the mixture passes from the entrance zones of the evaporator, which have a high temperature, to those which have a somewhat lower one. Having reached the end of the evaporator, the plastic that has been formed from the initial substance leaves the contact furnace in quantities which are adjustable and are automatically kept constant, and is then passed over a surface cooler where it is cooled down to normal temperature under atmospheric pressure so that the polycondensation reaction can be interrupted and the partly polycondensed carbamide resin stabilized in liquid form. The carbamide resin coming out of the surface cooler possesses an adequate temporary stability if further polycondensation, until the resin is fully hardened, is not to be effected by heating or by the addition of catalysts. The end product, however, is labile and thus responds even to small amounts of catalytic substances; this is a desirable property of the resin.

Apart from the action of the large-surface evaporator the high reaction speed of the process according to the present invention is also made possible by the catalysts. The liquid initial substance contains as catalyst, for instance, a given amount of thio urea which exerts its desired influence on polycondensation in the evaporator where the initial substance has been distributed over a very wide surface.

The process according to the invention, however, is not restricted to the catalyst described above. On the contrary, other known catalysts which are effective for the present purpose, can also be used.

In view of the rapid progress of polycondensation during the treatment in the contact furnace it is important for the present process that its interruption, made at a predetermined point in the course of the reaction, preferably in the B phase, should be as effective and as brief as possible. The surface cooler provided for this purpose, to which the plastic leaving the contact furnace is directly conveyed, consists of a structure of suitable shape which is cooled by a coolant and over the cooled surfaces of which the plastic is distributed extremely evenly by special means and continuously flows away. During this procedure the plastic is under atmospheric pressure, but the entire surface cooler is arranged in a casing so that the vapours escaping from the plastic can be exhausted. The vapours that escape during the cooling process are combined with the steam which is produced in the evaporator of the contact furnace, exhausted via pressure regulators and conveyed together with this steam through a recooling unit so that the vapours can be condensed for the purpose of recovering methanol and other readily volatile components.

The means for regulating the quantity of liquid initial substance fed to the contact furnace, the maximum temperature obtaining in the said furnace and the amount of steam exhausted from the furnace are all operated from a central control unit. The said means are controlled in such a way as to ensure a predetermined throughput remaining an accurately fixed time in the contact furnace, as well as constant pressure in the said furnace.

A typical example of the plant for carrying out the process is diagrammatically illustrated in the attached figure. The basic mixture 1 is in a tank 2 from which it is sucked by suitable delivery means, a fluid pump 3, for instance, via the pipe 4 and the strainer 5, and is fed under excess pressure to the feed regulator 6. This feed regulator 6 measures the quantity of initial substance flowing under excess pressure to the contact furnace 8 via the pipe 7 and is equipped with pressure and quantity indicators 9 and 10 respectively. The excess amount of liquid delivered by the pump 3 returns to the tank 2 via the pipe 11.

In the typical example illustrated the contact furnace 8 consists of a cylindrical, vertical container 12 which is enclosed at the bottom and is sealed by a cover 13 at the top so that it is airtight and resistant to pressure. Inside this container 12, 13 there is provided a large-surface evaporator in the form of a coaxially arranged tube 14, between the outer wall of which and the inner wall of the cylindrical container 12 a circular space 15 is formed into which the liquid initial substance 1 flows continuously from below via the pipe 7. The evaporator cylinder 14 stretches from the bottom of the container 12 practically to the cover 13 of the said container and forms there a horizontal rim 16 over which the liquid mounting upwards outside the evaporator cylinder 14 flows and passes into the interior of the said cylinder 14.

The liquid mounting in the circular space 15 is being continuously heated from normal temperature to a predetermined maximum temperature as a result of the heating units 17 acting on the outer wall of the container 12. The heating unit 17 consists in this typical example of an oil-filled, circular space 18 which surrounds the container 12 on all sides and in which a plurality of heating elements 19—preferably electric— are located. These elements are supplied via the conduit 20. A temperature measuring device 21 for the oil-filled jacket is provided and is connected via the conduit 22 to an automatic thermo-regulator 23 which receives another temperature indication via the conduit 24 from the interior of the contact furnace 8 and controls the heating unit 17 in such a way that the temperature in the contact furnace does not exceed a predetermined maximum, which is preferably between 140° C. and 150° C.

The initial substance mounting upwards in the circular space 15 outside the evaporator cylinder 14 has already attained the prescribed maximum temperature a longer or shorter time—depending on the throughput—before it reaches the rim 16. When it overflows the rim 16, the heated liquid enters the large-surface evaporator 14, runs down the latter's inner wall and passes into a channel 25 open to the top which runs in a spiral down the inside of the evaporator cylinder 14. In this open channel 25, which represents the essential part of the large-surface evaporator, polycondensation is effected under the influence of a pressure which is maintained constant in the contact furnace, preferably at about 4 gauge atmospheres, and of the temperature. This polycondensation proceeds so rapidly that the liquid 26 which collects at the bottom end of the evaporator cylinder already represents the desired labile carbamide resin which leaves the contact furnace via the discharge connection 27 and the outlet regulator 28. The mixture of vapours produced in the large-surface evaporator is exhausted from the contact furnace via a discharge valve 29 and the pipe 30 and is utilized in a manner to be described later.

It is important for the proper operation of the process that the level of the carbamide resin 26 in the lower part of the large-surface evaporator 16 should be maintained constant within given limits. This is ensured by an automatically operating level regulator 28a which is actuated by two feelers 28b arranged inside the evaporator 16. The two feelers 28b, which are preferably electrically operating contact arrangements, determine the maximum, or minimum, level of the carbamide resin 26 and act, via the level regulator 28a on the preferably discontinuously operating discharge valve 28 in such a way that the level of the carbamide resin does not exceed its maximum value or fall below its minimum value. The two feelers 28b can be set from the outside for the purpose of adjusting the level limits.

The carbamide resin coming out of the contact furnace 8 via the outlet regulator 28 requires, for the purpose of interrupting the polycondensation reaction and stabilizing the resin in a partly polycondensed condition, to be swiftly cooled down to normal temperature. To this end it is conveyed via the short pipe 31 into the surface cooler 32. In the typical example illustrated, which has given good results in operation, this cooler consists of the actual cooling surface 33—here in the form of a staircase—which is supplied with coolant 34, cooling water for instance, which enters the surface cooler 32 at 35 and leaves it via the pipe 36. The cooling surface, over which the liquid product from the contact furnace should flow, is arranged in an inclined position and the product to be cooled is evenly spread over the top end of the cooling surface 33 by means of a distributor, in this typical example a rotating roller 37. The end product, cooled down to normal temperature and now stable, leaves the surface cooler 32 via the discharge connection 38. The carbamide resin is, to be sure, cooled at normal atmospheric pressure, but the entire surface cooler is enclosed in a casing 39 which is airtight on all sides and from which the vapours liberated during the cooling process are exhausted via a pipe 40.

The mixture of vapours, which is under the pressure prevailing in the contact furnace 8 and is exhausted from the said furnace via the governor valve 29 and the pipe 30, is expanded in an injector unit 41 and the vacuum produced therein is used to exhaust the mixture of vapours from the surface cooler 32 via the pipe 40. The two mixtures of vapours pass through the cooler 42, in the pipe coil 43 for instance, and are condensed by coolant—the stream of cooling water, for example, which enters via the pipe 36 and is discharged at 44. By means of this condensation methanol and other readily volatile components which are produced during the process are recovered and exhausted via the pipe 45.

The regulating means which govern the course of the continuous fabrication process are all connected to a central process control unit 46. The feed regulator 6 is connected thereto via the control conduit 47, the thermo-regulator 23 via the control conduit 48 and the governor valve 29 via the control conduit 49. Through this process control unit the three regulating members are controlled by means of electric, pneumatic or other influences in such a way that the desired throughput is maintained and kept a predetermined time in the contact furnace and the interruption of the polycondensation reaction at the desired moment is ensured.

To enable the course of the reaction in the contact furnace 8 to be observed, the latter is provided with inspection windows 50 in the cover and at other suitable points and is equipped with interior lighting. Furthermore, it possesses directly acting temperature and pressure indicators 51, and 52, and a safety valve 53.

What I claim is:

1. An apparatus for the continuous fabrication of a labile plastic of the type which has as a base a plurality of plastic forming constituents and wherein there is an interruption in the polycondensation reaction with an abrupt decrease in temperature, said apparatus comprising feed pressure means for feeding adjustable quantities of plastic forming starting materials under pressure, a feed regulator communicating with said feed pressure means, a cylindrical, vertical contact furnace, said feed regulator conducting said adjusted starting materials to the bottom surfaces of said furnace, said contact furnace having a jacket circumjacently disposed thereon, a heating coil immersed in an oil solution in said jacket, a central control unit operatively connected to said feed regulator and said contact furnace, electrical means operatively interconnecting said heating coil and said central control unit, an inner evaporator cylinder disposed within said contact furnace, said inner evaporator being of a substantially lesser diameter than said contact furnace, said inner evaporator receiving said liquid substance which rises upwardly in the space between said contact furnace and said evaporator cylinder at a predetermined maximum temperature, spiral baffle means lining said inner evaporator, a discharge regulator valve interconnected to said inner evaporator, outflow regulating means connected to said discharge regulator valve for regulating the outflow of said formed liquid plastic material to interrupt polycondensation reaction and to stabilize the liquid plastic substance in a partly polycondensed condition, a pair of feelers disposed exteriorly adjacent said inner evaporator and operatively connected to said regulating means, an airtight cooling staircase interconnecting with said regulator valve for bringing the reacted liquid product to a lower normal temperature under atmospheric pressure, and a condensing unit interconnected with and communicating with said cooling means.

2. An apparatus for the continuous fabrication of a labile plastic in accordance with claim 1, wherein the airtight cooling staircase is comprised of a rotary roller to evenly distribute said liquid plastic material over the cooling surfaces of said staircase.

3. An apparatus for the continuous fabrication of a labile plastic in accordance with claim 1, wherein said airtight cooling staircase comprises exhaust means for conducting vapors and gases.

4. An apparatus for the continuous fabrication of a labile plastic in accordance with claim 1, comprising means operatively connecting said central control unit with said feed regulating means, thereby automatically insuring the process to follow to a predetermined throughput and the length of time the liquid plastic forming constituents remain in said contact furnace.

References Cited in the file of this patent

UNITED STATES PATENTS

| 1,307,588 | Lane | June 24, 1919 |
| 2,456,192 | Houlton | Dec. 14, 1948 |

FOREIGN PATENTS

| 274,855 | Switzerland | Apr. 30, 1951 |